United States Patent
Guo et al.

(10) Patent No.: US 11,798,563 B2
(45) Date of Patent: Oct. 24, 2023

(54) METHOD, APPARATUS AND DEVICE FOR VOICEPRINT RECOGNITION OF ORIGINAL SPEECH, AND STORAGE MEDIUM

(71) Applicant: PING AN TECHNOLOGY (SHENZHEN) CO., LTD., Shenzhen (CN)

(72) Inventors: Yuechao Guo, Shenzhen (CN); Yixuan Qiao, Shenzhen (CN); Yijun Tang, Shenzhen (CN); Jun Wang, Shenzhen (CN); Peng Gao, Shenzhen (CN); Guotong Xie, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 133 days.

(21) Appl. No.: 17/617,296

(22) PCT Filed: Aug. 26, 2020

(86) PCT No.: PCT/CN2020/111439
§ 371 (c)(1),
(2) Date: Dec. 7, 2021

(87) PCT Pub. No.: WO2021/217978
PCT Pub. Date: Nov. 4, 2021

(65) Prior Publication Data
US 2022/0254350 A1    Aug. 11, 2022

(30) Foreign Application Priority Data
Apr. 28, 2020  (CN) .......................... 202010351208.3

(51) Int. Cl.
*G10L 17/06*      (2013.01)
*G10L 17/02*      (2013.01)
(Continued)

(52) U.S. Cl.
CPC .............. *G10L 17/06* (2013.01); *G10L 17/02* (2013.01); *G10L 17/18* (2013.01); *G10L 25/18* (2013.01); *G10L 25/21* (2013.01)

(58) Field of Classification Search
None
See application file for complete search history.

(56) References Cited

U.S. PATENT DOCUMENTS 9,824,692 B1 * 11/2017 Khoury ................... G10L 15/16
10,706,857 B1 * 7/2020 Ramasubramanian ...................... G10L 17/10
(Continued)

FOREIGN PATENT DOCUMENTS

| CN | 109493847 A | 3/2019 |
|---|---|---|
| CN | 109637545 A | 4/2019 |

(Continued)

OTHER PUBLICATIONS

Cox, Richard V., and Carl-Erik W. Sundberg. "An efficient adaptive circular Viterbi algorithm for decoding generalized tailbiting convolutional codes." IEEE transactions on vehicular technology 43.1 (1994): 57-68. (Year: 1994).*

*Primary Examiner* — Douglas Godbold (57) ABSTRACT

A method for voiceprint recognition of an original speech is used to reduce information losses and system complexity of a model for data recognition of a speaker's original speech. The method includes: obtaining original speech data, and segmenting the original speech data based on a preset time length to obtain segmented speech data; performing tail-biting convolution processing and discrete Fourier transform on the segmented speech data through a preset convolution (Continued)

filter bank to obtain voiceprint feature data; pooling the voiceprint feature data through a preset deep neural network to obtain a target voiceprint feature; performing embedded vector transformation on the target voiceprint feature to obtain corresponding voiceprint feature vectors; and performing calculation on the voiceprint feature vectors through a preset loss function to obtain target voiceprint data, where the loss function includes a cosine similarity matrix loss function and a minimum mean square error matrix loss function.

20 Claims, 3 Drawing Sheets

(51) Int. Cl.
*G10L 17/18* (2013.01)
*G10L 25/18* (2013.01)
*G10L 25/21* (2013.01)

(56) References Cited

U.S. PATENT DOCUMENTS

| | | | | |
|---|---|---|---|---|
| 2006/0013395 | A1* | 1/2006 | Brundage | H04N 1/32272 380/255 |
| 2015/0127336 | A1* | 5/2015 | Lei | G10L 17/18 704/232 |
| 2019/0392842 | A1* | 12/2019 | Khoury | G10L 17/08 |
| 2020/0043504 | A1* | 2/2020 | Li | G10L 17/18 |
| 2021/0043216 | A1* | 2/2021 | Wang | G10L 17/18 |
| 2021/0082438 | A1* | 3/2021 | Zhao | G06N 3/08 |
| 2021/0280171 | A1* | 9/2021 | Phatak | G06N 3/045 |
| 2022/0059117 | A1* | 2/2022 | Shor | G06N 3/088 |
| 2022/0199095 | A1* | 6/2022 | Chang | G10L 17/02 |
| 2022/0208198 | A1* | 6/2022 | Chang | G10L 17/04 |

FOREIGN PATENT DOCUMENTS

| | | |
|---|---|---|
| CN | 109801635 A | 5/2019 |
| CN | 110164452 A | 8/2019 |
| CN | 111524525 A | 8/2020 |

* cited by examiner

FIG. 5

METHOD, APPARATUS AND DEVICE FOR VOICEPRINT RECOGNITION OF ORIGINAL SPEECH, AND STORAGE MEDIUM

CROSS REFERENCE TO THE RELATED APPLICATIONS

This application is the national phase entry of International Application No. PCT/CN2020/111439, filed on Aug. 26, 2020, which is based upon and claims priority to Chinese Patent Application No. 202010351208.3, filed on Apr. 28, 2020, the entire contents of which are incorporated herein by reference.

TECHNICAL FIELD

The present application relates to the field of speech signal processing, and in particular, to a method, apparatus and device for voiceprint recognition of an original speech, and a storage medium.

BACKGROUND

At present, a model for data recognition of a speaker's original speech extracts features from the speaker's original speech data through artificial feature engineering to obtain feature information, generates vector data of the feature information, performs channel noise fitting processing on the vector data to obtain fitted data, and performs speaker recognition on the fitted data to obtain corresponding speaker information.

The inventor realized that the obtained vector data cannot be directly used to recognize channel information differences of the same speaker or between different speakers, but needs to undergo channel noise fitting processing to obtain fitted data, and then the fitted data and other data need to undergo back-end reprocessing of calculation and analysis for speaker recognition, which increases complexity of a data processing system. In addition, when feature extraction is performed on the speaker's original speech data through artificial feature engineering, some information is lost. Therefore, the conventional model for data recognition of a speaker's original speech has high information losses and high system complexity.

SUMMARY

A main objective of the present application is to address high information losses and high system complexity existing in a conventional model for data recognition of a speaker's original speech.

To achieve the foregoing objective, according to a first aspect of the present application, a method for voiceprint recognition of an original speech is provided, including: obtaining original speech data, and segmenting the original speech data based on a preset time length to obtain segmented speech data; performing tail-biting convolution processing and discrete Fourier transform on the segmented speech data through a preset convolution filter bank to obtain voiceprint feature data corresponding to the segmented speech data; pooling the voiceprint feature data corresponding to the segmented speech data through a preset deep neural network to obtain a target voiceprint feature; performing embedded vector transformation on the target voiceprint feature to obtain corresponding voiceprint feature vectors; and performing calculation on the voiceprint feature vectors through a preset loss function to obtain target voiceprint data, where the loss function includes a cosine similarity matrix loss function and a minimum mean square error matrix loss function.

According to a second aspect of the present application, a device for voiceprint recognition of an original speech is provided, including: a memory, a processor and computer-readable instructions stored in the memory and executable on the processor, where the processor implements the following steps when executing the computer-readable instructions: obtaining original speech data, and segmenting the original speech data based on a preset time length to obtain segmented speech data; performing tail-biting convolution processing and discrete Fourier transform on the segmented speech data through a preset convolution filter bank to obtain voiceprint feature data corresponding to the segmented speech data; pooling the voiceprint feature data corresponding to the segmented speech data through a preset deep neural network to obtain a target voiceprint feature; performing embedded vector transformation on the target voiceprint feature to obtain corresponding voiceprint feature vectors; and performing calculation on the voiceprint feature vectors through a preset loss function to obtain target voiceprint data, where the loss function includes a cosine similarity matrix loss function and a minimum mean square error matrix loss function.

According to a third aspect of the present application, a computer-readable storage medium is provided, where the computer-readable storage medium stores computer instructions, and when the computer instructions are run on a computer, the computer is enabled to perform the following steps: obtaining original speech data, and segmenting the original speech data based on a preset time length to obtain segmented speech data; performing tail-biting convolution processing and discrete Fourier transform on the segmented speech data through a preset convolution filter bank to obtain voiceprint feature data corresponding to the segmented speech data; pooling the voiceprint feature data corresponding to the segmented speech data through a preset deep neural network to obtain a target voiceprint feature; performing embedded vector transformation on the target voiceprint feature to obtain corresponding voiceprint feature vectors; and performing calculation on the voiceprint feature vectors through a preset loss function to obtain target voiceprint data, where the loss function includes a cosine similarity matrix loss function and a minimum mean square error matrix loss function.

According to a fourth aspect of the present application, an apparatus for voiceprint recognition of an original speech is provided, including: a segmentation module, configured to obtain original speech data, and segment the original speech data based on a preset time length to obtain segmented speech data; a first processing module, configured to perform tail-biting convolution processing and discrete Fourier transform on the segmented speech data through a preset convolution filter bank to obtain voiceprint feature data corresponding to the segmented speech data; a second processing module, configured to pool the voiceprint feature data corresponding to the segmented speech data through a preset deep neural network to obtain a target voiceprint feature; a third processing module, configured to perform embedded vector transformation on the target voiceprint feature to obtain corresponding voiceprint feature vectors; and a calculation module, configured to perform calculation on the voiceprint feature vectors through a preset loss function to obtain target voiceprint data, where the loss function includes a cosine similarity matrix loss function and a minimum mean square error matrix loss function.

In the technical solution according to the present application, original speech data is obtained, and the original speech data is segmented based on a preset time length to obtain segmented speech data; tail-biting convolution processing and discrete Fourier transform are performed on the segmented speech data through a preset convolution filter bank to obtain voiceprint feature data; the voiceprint feature data is pooled through a preset deep neural network to obtain a target voiceprint feature; embedded vector transformation is performed on the target voiceprint feature to obtain voiceprint feature vectors; and calculation is performed on the voiceprint feature vectors through a preset loss function to obtain target voiceprint data, where the loss function includes a cosine similarity matrix loss function and a minimum mean square error matrix loss function. In the present application, a new loss function is used to eliminate noise information in channels for recognizing voiceprint feature information in original speech data, and reduce information losses; a preset convolution filter bank is used as a structure for front-end preprocessing on the original speech data to obtain voiceprint feature data; a preset deep neural network is used to pool the voiceprint feature data; and a cosine similarity matrix loss function and a minimum mean square error matrix loss function are used to process voiceprint feature vectors to obtain target voiceprint data in the form of a similarity matrix or an embedded vector. The structural form in which the speaker's original speech data is at an input end and the target voiceprint data in the form of the similarity matrix or the embedded vector is at an output end simplifies a system structure, reduces calculation of variables, improves accuracy of a model for data recognition of a speaker's original speech, and reduces system complexity. Therefore, the present application reduces the information losses and the system complexity of the model for data recognition of a speaker's original speech.

DETAILED DESCRIPTION OF THE EMBODIMENTS

Embodiments of the present application provide a method, apparatus and device for voiceprint recognition of an original speech, and a storage medium. A new loss function is used to eliminate noise information in channels for recognizing voiceprint feature information in the original speech data, and reduce information losses; a preset convolution filter bank is used as a structure for front-end preprocessing on the original speech data to obtain voiceprint feature data; a preset deep neural network is used to pool the voiceprint feature data; and a cosine similarity matrix loss function and a minimum mean square error matrix loss function are used to process voiceprint feature vectors to obtain target voiceprint data in the form of a similarity matrix or an embedded vector. The structural form in which the speaker's original speech data is at an input end and the target voiceprint data in the form of the similarity matrix or the embedded vector is at an output end simplifies a system structure, reduces calculation of variables, improves accuracy of a model for data recognition of a speaker's original speech, and reduces system complexity. Therefore, the embodiments of the present application reduce the information losses and the system complexity of the model for data recognition of a speaker's original speech.

Terms "first", "second", "third", "fourth", etc. (if any) in the specification, claims, and accompanying drawings of the present application are used to distinguish between similar objects without having to describe a specific order or sequence. It should be understood that data used in this way may be interchanged under appropriate circumstances, so that the embodiments described herein can be implemented in an order other than that illustrated or described herein. In addition, the term "including" or "having" and any variants thereof are intended to cover non-exclusive inclusions. For example, a process, method, system, product, or device that includes a series of steps or units is not necessarily limited to those steps or units clearly listed, and may include other steps or units that are not clearly listed or are inherent to the process, method, product, or device.

Figure 1:
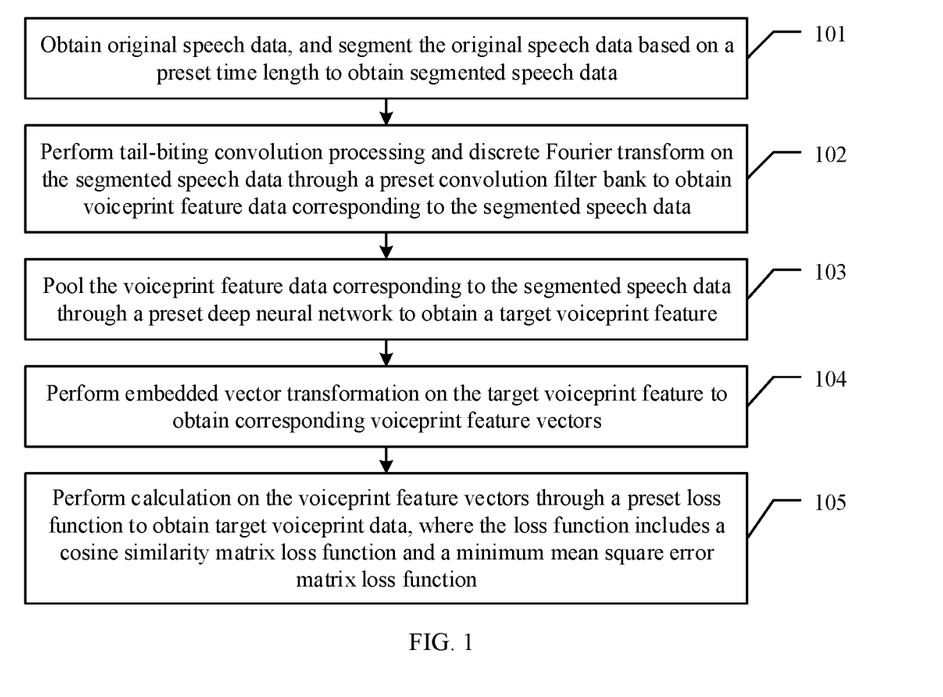
FIG. 1 is a schematic diagram of a method for voiceprint recognition of an original speech according to an embodiment of the present application.

For ease of understanding, a specific process of an embodiment of the present application is described below. Referring to FIG. 1, a method for voiceprint recognition of an original speech in an embodiment of the present application includes the following steps.

101: Obtain original speech data, and segment the original speech data based on a preset time length to obtain segmented speech data.

It is understandable that an execution body of the present application may be an apparatus for voiceprint recognition of an original speech or a terminal or a server, which is not specifically limited herein. In this embodiment of the present application, that the server is the execution body is used as an example for description.

After the original speech data is input at a client, the server invokes a preset sampler and samples the original speech data through the preset sampler to obtain original audio data, obtains a sampling frequency of the preset sampler, and calculates a reciprocal of the sampling frequency to obtain a sampling time. The sampling time is used as the preset time length. The sampler transmits the obtained original audio data and the preset time length to a database of the server, and the server extracts the original audio data from the database and segments the original audio data based on the preset time length to obtain the segmented speech data, and a data length of each segment of segmented speech data is the same. The original speech data is segmented to facilitate subsequent processing on the original speech data and provide a basis for judging whether an information loss occurs after the preprocessing on the original speech data.

102: Perform tail-biting convolution processing and discrete Fourier transform on the segmented speech data through a preset convolution filter bank to obtain voiceprint feature data corresponding to the segmented speech data.

After the server obtains the segmented speech data, there are T segments of segmented speech data in total, and the data length of each segment of segmented speech data is H. The T segments of segmented speech data are input to K preset groups of convolution filters (i.e., the preset convolution filter bank), and the K groups of convolution filters perform tail-biting convolutional coding of a multi-layer structure on each segment of segmented speech data through a preset tail-biting convolutional code, so as to perform preliminary feature extraction on the segmented speech data to obtain candidate voiceprint feature data with a shallow expression. A data shape of each piece of candidate voiceprint feature data is (T, K, H). Calculation is performed on the candidate voiceprint feature data by using a preset discrete Fourier transform formula to obtain the voiceprint feature data. A data length of each piece of voiceprint feature data is H. A data form of each piece of voiceprint feature data is still (T, K, H). A comprehensive data form of all voiceprint feature data is still (N, M, T, K, H). N denotes the number of speakers in the original speech data. M denotes an amount of voiceprint feature data corresponding to each speaker.

A length of a DFT interval in the preset discrete Fourier transform formula is H (i.e., the data length of each segment of segmented speech data is H). After the K groups of convolution filters perform tail-biting convolutional coding and discrete Fourier transform on the segmented speech data, the data length of the obtained candidate voiceprint data does not change. Such practice addresses code rate losses, does not affect error check properties of the convolutional code, prevents information losses in feature extraction on the segmented speech data, and ensures quality of features. Further, the candidate voiceprint feature data is converted from time domain data into concise frequency domain data, which reduces a calculation amount and facilitates subsequent processing on the voiceprint feature data. It should be noted that, to further ensure privacy and security of the voiceprint feature data, the voiceprint feature data may be further stored in a node of a blockchain.

103: Pool the voiceprint feature data corresponding to the segmented speech data through a preset deep neural network to obtain a target voiceprint feature.

Through a pooling layer in the preset deep neural network, the server uses a preset sliding window to slide on an array table generated from arrays of the voiceprint feature data corresponding to the segmented speech data from left to right and from top to bottom starting from the top left of the array table, so as to obtain window data corresponding to the sliding window. One position of the sliding window on the array table corresponds to one piece of window data. A maximum value in each piece of window data is determined to obtain the maximum value in each piece of window data to implement max pooling, and an average value of each piece of window data is calculated to obtain an average value corresponding to each piece of window data to implement average pooling, so as to obtain a target voiceprint feature having undergone max pooling and average pooling. The pooling reduces a space size of the preset deep neural network and network parameters that need to be learned, and prevents over-fitting.

104: Perform embedded vector transformation on the target voiceprint feature to obtain corresponding voiceprint feature vectors.

The server performs calculation on the target voiceprint feature through a weight matrix of a hidden layer in a preset skip-gram model to obtain candidate voiceprint feature vectors having undergone gradient descent, and a regression classifier of an output layer in the skip-gram model is used to perform regression classification on the candidate voiceprint feature vectors to obtain the corresponding voiceprint feature vectors. Or, a multi-layer bidirectional language model in a preset deep contextualized word representation (embedding from language model (ELMo)) model is used to maximize a joint likelihood function of a forward-backward language model to perform calculation on the target voiceprint feature to obtain the candidate voiceprint feature vectors, and the candidate voiceprint vectors are integrated into weights to obtain the corresponding voiceprint feature vectors. The voiceprint feature vectors each may be a word embedding vector or a sentence embedding vector. The voiceprint feature vectors obtained by using the skip-gram model and the ELMo model are word embedding vectors. A preset neural bag-of-words model is used to average or sum the voiceprint feature vectors being word embedding vectors, or a preset recurrent neural network is used to recursively process the voiceprint feature vectors being word embedding vectors based on a preset external topological structure (such as a component syntax tree), so as to perform embedded vector transformation representation on the target voiceprint feature.

105: Perform calculation on the voiceprint feature vectors through a preset loss function to obtain target voiceprint data, where the loss function includes a cosine similarity matrix loss function and a minimum mean square error matrix loss function.

After obtaining the voiceprint feature vectors, the server performs calculation on the voiceprint feature vector data by using the cosine similarity matrix loss function and the minimum mean square error matrix loss function in the preset loss function to obtain first initial vector data and second initial vector data, performs calculation on the second initial vector data by using a preset network training function to obtain second vector data, and calculates a weighted average of the first initial vector data and the second vector data to obtain the target voiceprint data.

The preset network training function is an adjustment rule for adjusting a value of the part of minimum mean square error (MMSE) matrix loss function of the entire system. The preset network training function may be a gradient descent algorithm or a conjugate gradient algorithm, which is used to perform error minimization on the second initial vector data. The server performs calculation on the voiceprint feature vector data by using the cosine similarity matrix loss function and the minimum mean square error matrix loss function to obtain the first initial vector data and the second initial vector data. The minimum mean square error matrix loss function uses a global average for calculation. As randomness of the global average is relatively strong, channel noise information cannot be accurately captured. Therefore, it is necessary to perform calculation on the second initial vector data by using the preset network training function to obtain the second vector data. The weighted average of the first initial vector data and the second vector data is calculated to obtain a similarity matrix or embedding vector including a calculated weight value. Therefore, on the basis of elimination of noise information in channels and reduced system complexity, a relatively accurate similarity matrix can be obtained, and accuracy of the obtained embedded vector data is improved.

The loss function including the cosine similarity matrix loss function and the minimum mean square error matrix loss function is used to add loss items for modeling sound channel information, so that a structural network composed of the preset convolution filter bank and the deep neural network can not only learn long-term feature expression of speaker information (voiceprint information), but also learn how to eliminate noise information in channels, improve recognition accuracy, directly output a similarity matrix or embedded vector containing the speaker information, and reduce operation steps for processing original speech data and system complexity.

In the embodiment of the present application, a new loss function is used to eliminate noise information in channels for recognizing voiceprint feature information in original speech data, and reduce information losses; a preset convolution filter bank is used as a structure for front-end preprocessing on the original speech data to obtain voiceprint feature data; a preset deep neural network is used to pool the voiceprint feature data; and a cosine similarity matrix loss function and a minimum mean square error matrix loss function are used to process voiceprint feature vectors to obtain target voiceprint data in the form of a similarity matrix or an embedded vector. The structural form in which the speaker's original speech data is at an input end and the target voiceprint data in the form of the similarity matrix or the embedded vector is at an output end simplifies a system structure, reduces calculation of variables, improves accuracy of a model for data recognition of a speaker's original speech, and reduces system complexity. Therefore, the embodiment of the present application reduces the information losses and the system complexity of the model for data recognition of a speaker's original speech.

Figure 2:
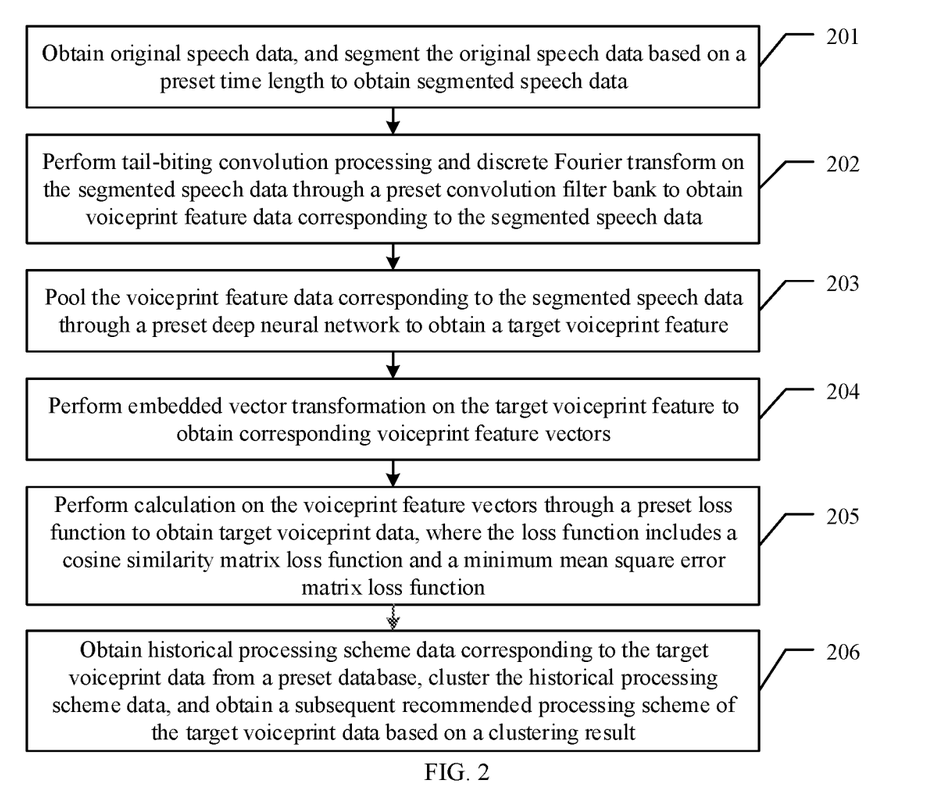
FIG. 2 is a schematic diagram of a method for voiceprint recognition of an original speech according to another embodiment of the present application.

Referring to FIG. 2, a method for voiceprint recognition of an original speech according to another embodiment of the present application includes the following steps.

201: Obtain original speech data, and segment the original speech data based on a preset time length to obtain segmented speech data.

Specifically, a server obtains the original speech data, and segments the original speech data based on the preset time length to obtain the segmented speech data, including: obtaining the original speech data, and performing breakpoint detection on the original speech data based on speech signal energy and a zero-crossing rate to obtain candidate speech data; performing channel detection and channel classification on the candidate speech data to obtain speech data corresponding to each classified channel; and segmenting the speech data corresponding to each classified channel based on the preset time length to obtain the segmented speech data.

Before segmenting the original speech data, the server performs signal processing on the original speech data to obtain an energy diagram, calculates short-time frame energy and a short-time frame zero-crossing rate of each speech frame in the original speech data, sets a first threshold based on the short-time frame energy, calculates average energy of background noise, and sets a second threshold based on the average energy of the background noise, where a value of the second threshold is less than that of the first threshold. The server analyzes and screens the energy diagram based on the first threshold, the second threshold and the short-time frame zero-crossing rate, so as to perform effective speech detection on the original speech data and obtain valid speech data (i.e., candidate speech data) corresponding to a speaker with mute and slowly time-varying noise screened out. The server performs cross-channel correlation detection on the candidate speech data to detect and classify cross-talk speech in the original speech data to obtain the speech data on different classified channels. The breakpoint detection based on the speech signal energy and the zero-crossing rate, channel detection and speaker factor extraction and labeling that are performed on the original speech data ensure quality of the original speech data, and further facilitate subsequent data processing on the original speech data.

202: Perform tail-biting convolution processing and discrete Fourier transform on the segmented speech data through a preset convolution filter bank to obtain voiceprint feature data corresponding to the segmented speech data.

Specifically, the server performs tail-biting convolution processing and discrete Fourier transform on the segmented speech data through the preset convolution filter bank to obtain the voiceprint feature data corresponding to the segmented speech data, including: obtaining the total number of segments of the segmented speech data, and obtaining the number of convolution filters in the preset convolution filter bank; setting a tail-biting convolutional code based on the total number of the segments of the segmented speech data, the preset time length and the number of the convolution filters, and storing the tail-biting convolutional code in a convolutional encoder group in the convolution filter bank; encoding the segmented speech data through the convolutional encoder group to obtain candidate voiceprint feature data corresponding to the segmented speech data; and performing discrete Fourier transform on the candidate voiceprint feature data to obtain the voiceprint feature data corresponding to the segmented speech data.

The preset time length is used as a constraint length of the tail-biting convolutional code, the number of the segments of the segmented speech data is used as the number of bits input to the convolutional coder each time, the number of the convolution filters in the preset convolution filter bank is used as the number of dimensions of output group codewords, a value obtained by dividing the number of the segments of the segmented speech data by the number of the dimensions of the output group codewords is used as a coding rate, and an obtained tail-biting convolutional code is (T, K, H). The tail-biting convolutional code is set based on the number of the segments, the preset time length and the number of the convolution filters, to prevent information losses during voiceprint feature extraction from the segmented speech data. After tail-biting convolution is performed on the segmented speech data, the candidate voiceprint feature data can be decoded by using a bidirectional Viterbi algorithm with the shortest path achieved through dynamic planning to obtain decoded voiceprint feature data, and then discrete Fourier transform is performed on the decoded voiceprint feature data to obtain the voiceprint feature data corresponding to the segmented speech data.

203: Pool the voiceprint feature data corresponding to the segmented speech data through a preset deep neural network to obtain a target voiceprint feature.

Specifically, the server pools the voiceprint feature data corresponding to the segmented speech data through the preset deep neural network to obtain the target voiceprint feature, including: capturing data from the voiceprint feature data corresponding to the segmented speech data through a sliding window in the preset deep neural network to obtain a plurality of sets of window data; separately calculating a maximum value and an average value of each of the plurality of sets of window data, where the maximum value of each set of window data is used as a first speaker feature, and the average value of each set of window data is used as a second speaker feature; and fusing the first speaker feature and the second speaker feature to obtain the target voiceprint feature.

After obtaining the maximum value and the average value of each set of window data corresponding to the voiceprint feature data corresponding to the segmented speech data, the server performs fusion concatenate processing on the maximum values and the average values of all window data to obtain maximum value fusion data and average value fusion data, and uses the maximum value fusion data and the average value fusion data as the target voiceprint feature obtained by pooling the voiceprint feature data corresponding to the segmented speech data through the preset deep neural network. Take the average value fusion data as an example: A data shape of voiceprint feature data of a piece of original speech data corresponding to segmented speech data is (T, K, H), and average pooling is performed on the T dimension of the voiceprint feature data corresponding to the segmented speech data to obtain a data form (K, H) of an average value of each set of window data, and the K-dimensional voiceprint feature data corresponding to the segmented speech data is fused to obtain average value fusion data with a data form (1, KH). If there are S speakers in total in a batch of original speech data, and each speaker has D pieces of original speech data, a target voiceprint feature with a data form (SD, KH) is obtained through average pooling.

204: Perform embedded vector transformation on the target voiceprint feature to obtain corresponding voiceprint feature vectors.

The server performs calculation on the target voiceprint feature through a weight matrix of a hidden layer in a preset skip-gram model to obtain candidate voiceprint feature vectors having undergone gradient descent, and a regression classifier of an output layer in the skip-gram model is used to perform regression classification on the candidate voiceprint feature vectors to obtain the corresponding voiceprint feature vectors. Or, a multi-layer bidirectional language model in a preset deep contextualized word representation (embedding from language model (ELMo)) model is used to maximize a joint likelihood function of a forward-backward language model to perform calculation on the target voiceprint feature to obtain the candidate voiceprint feature vectors, and the candidate output vectors are integrated into weights to obtain corresponding voiceprint feature vectors. The voiceprint feature vectors each may be a word embedding vector or a sentence embedding vector. The voiceprint feature vectors obtained by using the skip-gram model and the ELMo model are word embedding vectors. A preset neural bag-of-words model is used to average or sum the voiceprint feature vectors being word embedding vectors, or a preset recurrent neural network is used to recursively process the voiceprint feature vectors being word embedding vectors based on a preset external topological structure (such as a component syntax tree), so as to perform embedded vector transformation representation on the target voiceprint feature.

205: Perform calculation on the voiceprint feature vector through a preset loss function to obtain target voiceprint data, where the loss function includes a cosine similarity matrix loss function and a minimum mean square error matrix loss function.

After obtaining the voiceprint feature vectors, the server performs calculation on the voiceprint feature vector data by using the cosine similarity matrix loss function and the minimum mean square error matrix loss function in the preset loss function to obtain first initial vector data and second initial vector data, performs calculation on the second initial vector data by using a preset network training function to obtain second vector data, and calculates a weighted average of the first initial vector data and the second vector data to obtain the target voiceprint data.

The preset network training function is an adjustment rule for adjusting a value of the part of minimum mean square error (MMSE) matrix loss function of the entire system. The preset network training function may be a gradient descent algorithm or a conjugate gradient algorithm, which is used to perform error minimization on the second initial vector data. The server performs calculation on the voiceprint feature vector data by using the cosine similarity matrix loss function and the minimum mean square error matrix loss function to obtain the first initial vector data and the second initial vector data. The minimum mean square error matrix loss function uses a global average for calculation. As randomness of the global average is relatively strong, channel noise information cannot be accurately captured. Therefore, it is necessary to perform calculation on the second initial vector data by using the preset network training function to obtain the second vector data. The weighted average of the first initial vector data and the second vector data is calculated to obtain a similarity matrix or embedding vector including a calculated weight value. Therefore, on the basis of elimination of noise information in channels and reduced system complexity, a relatively accurate similarity matrix can be obtained, and accuracy of the obtained embedded vector data is improved.

Specifically, the preset loss function is as follows:

$$L = L(a_{ji}) + \gamma \left( -MMSE_j + \log \sum_{k=1}^{N} \exp(MMSE_j) \right),$$

the cosine similarity matrix loss function is as follows:

$$L(a_{ji}) = -S_{ji,j} + \log \sum_{k=1}^{N} \exp(S_{ji,k}), S_{ji,k} = \begin{cases} w \cdot \cos(a_{ji}, c_j^{(-i)}) + b, & \text{if } k = j \\ w \cdot \cos(a_{ji}, c_k) + b, & \text{others} \end{cases},$$

and
the minimum mean square error matrix loss function is as follows:

$$MMSE_j = \mu \frac{1}{M} \sum_{i=1}^{M} (a_{ji} - LC_{j,t})^2 + \theta, LC_{j,t} = \beta LC_{j,t-1} + (1-\beta) \frac{1}{M} \sum_{i=1}^{M} a_{ji},$$

where $a_{ji}$ denotes the $i^{th}$ voiceprint feature vector of the $j^{th}$ speaker, $\gamma$ denotes an adjustment factor, which is used to adjust a value of the part of MMSE matrix loss function of the entire system, N denotes the number of voiceprint feature vectors corresponding to each) speaker, k denotes the $k^{th}$ exp($MMSE_j$) value, $c_j^{(-i)}$ and $c_k$ each denote an average value of the voiceprint feature vectors of the $j^{th}$ speaker excluding the $i^{th}$ voiceprint feature vector, w, b, $\mu$, $\theta$ and $\beta$ each denote a preset random variable, $LC_{j,t}$ denotes an average value of the voiceprint feature vectors corresponding to the $j^{th}$ speaker among the voiceprint feature vectors at a time t, and M denotes the number of speakers corresponding to the voiceprint feature vectors.

206: Obtain historical processing scheme data corresponding to the target voiceprint data from a preset database, cluster the historical processing scheme data, and obtain a subsequent recommended processing scheme of the target voiceprint data based on a clustering result.

The historical processing scheme data is historically stored processing data generated by using the obtained voiceprint data in subsequent data analysis of other types. For example, original speech data at a meeting is processed to obtain voiceprint data, and speaker role labeling is performed on the obtained voiceprint data. Speaker data having undergone speaker role labeling is classified based on speaker roles to obtain classified data, and division of key content is performed on the classified data based on speech tone change analysis to obtain classified speech note information of the meeting. After obtaining the target voiceprint data, the server creates a key value of the target voiceprint data, searches a preset database through the key value, obtains historical processing scheme data which is the same as or similar to the key value and is used for subsequent data analysis, obtains a weight value of the historical processing scheme data, sorts and screens the historical processing scheme data based on the weight value, obtains historical processing scheme data sorted within a preset range to obtain processed data, and performs preliminary clustering on the processed data by using a K-means clustering algorithm to obtain an initial clustering scheme. In-depth clustering is performed on the initial clustering scheme by using an expectation maximization (EM) clustering algorithm based on a Gaussian mixture model (GMM) to obtain a processing type. Processing scheme information of a type the same as or similar to the processing type is obtained from the historically stored processing scheme information based on the processing type to obtain weight values of the processing scheme information, the weight values of the processing scheme information are sorted in descending order, and processing scheme information in a preset sorting range is used as a subsequent recommended processing scheme for the target voiceprint data.

Optionally, after obtaining the subsequent recommended processing scheme information for the target voiceprint data, the server stores the target voiceprint data in a preset disaster recovery center, and sends an execution request for the subsequent recommended processing scheme information of the target voiceprint data to a client. If the server receives within a preset time an acceptance request returned by the client, the server performs subsequent data analysis and processing on the target voiceprint data based on the subsequent recommended processing scheme for the target voiceprint data. The intelligent recommended processing scheme information is used to reduce information losses and system complexity of a model for data recognition of an original speech, and improve intelligence, autonomy and convenience of processing on the original speech data by the model for data recognition of an original speech.

In the embodiment of the present application, the intelligent recommended processing scheme information is used to reduce information losses and system complexity of a model for data recognition of a speaker's original speech, and improve intelligence, autonomy and convenience of processing on the original speech data by the model for data recognition of a speaker's original speech.

Figure 3:
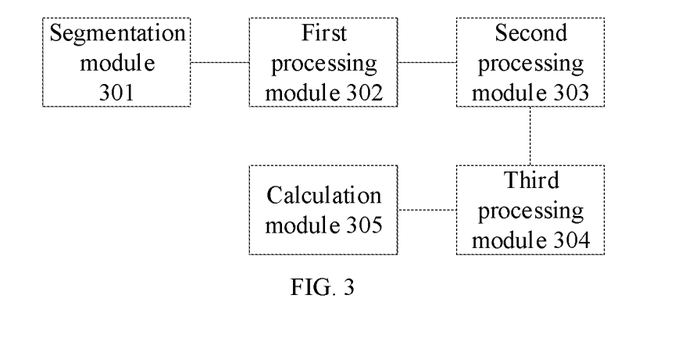
FIG. 3 is a schematic diagram of an apparatus for voiceprint recognition of an original speech according to an embodiment of the present application.

The method for voiceprint recognition of an original speech according to the embodiment of the present application is described above. An apparatus for voiceprint recognition of an original speech according to an embodiment of the present application is described below. Referring to FIG. 3, an apparatus for voiceprint recognition of an original speech in an embodiment of the present application includes:

a segmentation module 301, configured to obtain original speech data, and segment the original speech data based on a preset time length to obtain segmented speech data;

a first processing module 302, configured to perform tail-biting convolution processing and discrete Fourier transform on the segmented speech data through a preset convolution filter bank to obtain voiceprint feature data corresponding to the segmented speech data;

a second processing module 303, configured to pool the voiceprint feature data corresponding to the segmented speech data through a preset deep neural network to obtain a target voiceprint feature;

a third processing module 304, configured to perform embedded vector transformation on the target voiceprint feature to obtain corresponding voiceprint feature vectors; and a calculation module 305, configured to perform calculation on the voiceprint feature vector through a preset loss function to obtain target voiceprint data, where the loss function includes a cosine similarity matrix loss function and a minimum mean square error matrix loss function.

In the embodiment of the present application, a new loss function is used to eliminate noise information in channels for recognizing voiceprint feature information in original speech data, and reduce information losses; a preset convolution filter bank is used as a structure for front-end preprocessing on the original speech data to obtain voiceprint feature data; a preset deep neural network is used to pool the voiceprint feature data; and a cosine similarity matrix loss function and a minimum mean square error matrix loss function are used to process voiceprint feature vectors to obtain target voiceprint data in the form of a similarity matrix or an embedded vector. The structural form in which the speaker's original speech data is at an input end and the target voiceprint data in the form of the similarity matrix or the embedded vector is at an output end simplifies a system structure, reduces calculation of variables, improves accuracy of a model for data recognition of a speaker's original speech, and reduces system complexity. Therefore, the embodiment of the present application reduces the information losses and the system complexity of the model for data recognition of a speaker's original speech.

Figure 4:
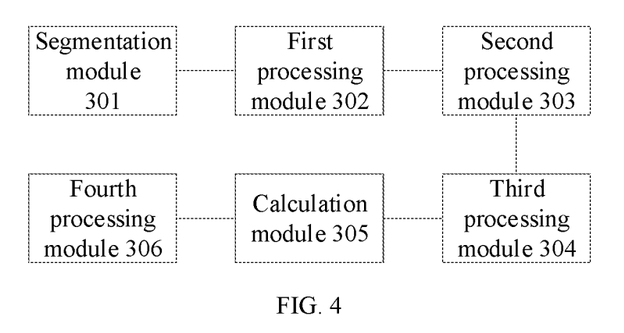
FIG. 4 is a schematic diagram of an apparatus for voiceprint recognition of an original speech according to another embodiment of the present application.

Referring to FIG. 4, an apparatus for voiceprint recognition of an original speech according to another embodiment of the present application includes:

a segmentation module 301, configured to obtain original speech data, and segment the original speech data based on a preset time length to obtain segmented speech data;

a first processing module 302, configured to perform tail-biting convolution processing and discrete Fourier transform on the segmented speech data through a preset convolution filter bank to obtain voiceprint feature data corresponding to the segmented speech data;

a second processing module 303, configured to pool the voiceprint feature data corresponding to the segmented speech data through a preset deep neural network to obtain a target voiceprint feature;

a third processing module 304, configured to perform embedded vector transformation on the target voiceprint feature to obtain corresponding voiceprint feature vectors; and a calculation module 305, configured to perform calculation on the voiceprint feature vector through a preset loss function to obtain target voiceprint data, where the loss function includes a cosine similarity matrix loss function and a minimum mean square error matrix loss function; and a fourth processing module 306, configured to obtain historical processing scheme data corresponding to the target voiceprint data from a preset database, cluster the historical processing scheme data, and obtain a subsequent recommended processing scheme of the target voiceprint data based on a clustering result.

Optionally, the first processing module 302 may be further specifically configured to:

obtain the original speech data, and perform breakpoint detection on the original speech data based on speech signal energy and a zero-crossing rate to obtain candidate speech data;

perform channel detection and channel classification on the candidate speech data to obtain speech data corresponding to each classified channel; and segment the speech data corresponding to each classified channel based on the preset time length to obtain the segmented speech data.

Optionally, the first processing module 302 may be further specifically configured to: obtain the total number of segments of the segmented speech data, and obtain the number of convolution filters in the preset convolution filter bank;

set a tail-biting convolutional code based on the total number of the segments of the segmented speech data, the preset time length and the number of the convolution filters, and store the tail-biting convolutional code in a convolutional encoder group in the convolution filter bank;

encode the segmented speech data through the convolutional encoder group to obtain candidate voiceprint feature data corresponding to the segmented speech data; and perform discrete Fourier transform on the candidate voiceprint feature data to obtain the voiceprint feature data corresponding to the segmented speech data. It should be noted that, to further ensure privacy and security of the voiceprint feature data, the voiceprint feature data may be further stored in a node of a blockchain.

Optionally, the second processing module 303 may be further specifically configured to:

capture data from the voiceprint feature data corresponding to the segmented speech data through a sliding window in the preset deep neural network to obtain a plurality of sets of window data;

separately calculate a maximum value and an average value of each of the plurality of sets of window data, where the maximum value of each set of window data is used as a first speaker feature, and the average value of each set of window data is used as a second speaker feature; and fuse the first speaker feature and the second speaker feature to obtain the target voiceprint feature.

Optionally, the preset loss function in the apparatus for voiceprint recognition of an original speech is as follows:

$$L = L(a_{ji}) + \gamma\left(-MMSE_j + \log\sum_{k=1}^{N} \exp(MMSE_j)\right),$$

the cosine similarity matrix loss function is as follows:

$$L(a_{ji}) = -S_{ji,j} + \log\sum_{k=1}^{N} \exp(S_{ji,k}), S_{ji,k} = \begin{cases} w \cdot \cos(a_{ji}, c_j^{(-i)}) + b, & \text{if } k = j \\ w \cdot \cos(a_{ji}, c_k) + b, & \text{others} \end{cases},$$

and the minimum mean square error matrix loss function is as follows:

$$MMSE_j = \mu \frac{1}{M}\sum_{i=1}^{M}(a_{ji} - LC_{j,t})^2 + \theta, \ LC_{j,t} = \beta LC_{j,t-1} + (1-\beta)\frac{1}{M}\sum_{i=1}^{M} a_{ji},$$

where $a_{ji}$ denotes the $i^{th}$ voiceprint feature vector of the $j^{th}$ speaker, $\gamma$ denotes an adjustment factor, N denotes the number of voiceprint feature vectors corresponding to each speaker, k denotes the $k^{th}$ exp($MMSE_j$) value, $c_j^{(-i)}$ and $c_k$ each denote an average value of the voiceprint feature vectors of the $j^{th}$ speaker excluding the $i^{th}$ voiceprint feature vector, w, b, $\mu$, $\theta$ and $\beta$ each denote a preset random variable, $LC_{j,t}$ denotes an average value of the voiceprint feature vectors corresponding to the $j^{th}$ speaker among the voiceprint feature vectors at a time t, and M denotes the number of speakers corresponding to the voiceprint feature vectors.

In the embodiment of the present application, the intelligent recommended processing scheme information is used to reduce information losses and system complexity of a model for data recognition of a speaker's original speech, and improve intelligence, autonomy and convenience of processing on the original speech data by the model for data recognition of a speaker's original speech.

The apparatus for voiceprint recognition of an original speech in the embodiment of the present application is described in detail above from the perspective of modular functional entities with reference to FIG. 3 and FIG. 4. A device for voiceprint recognition of an original speech in an embodiment of the present application is described in detail below from the perspective of hardware processing.

Figure 5:
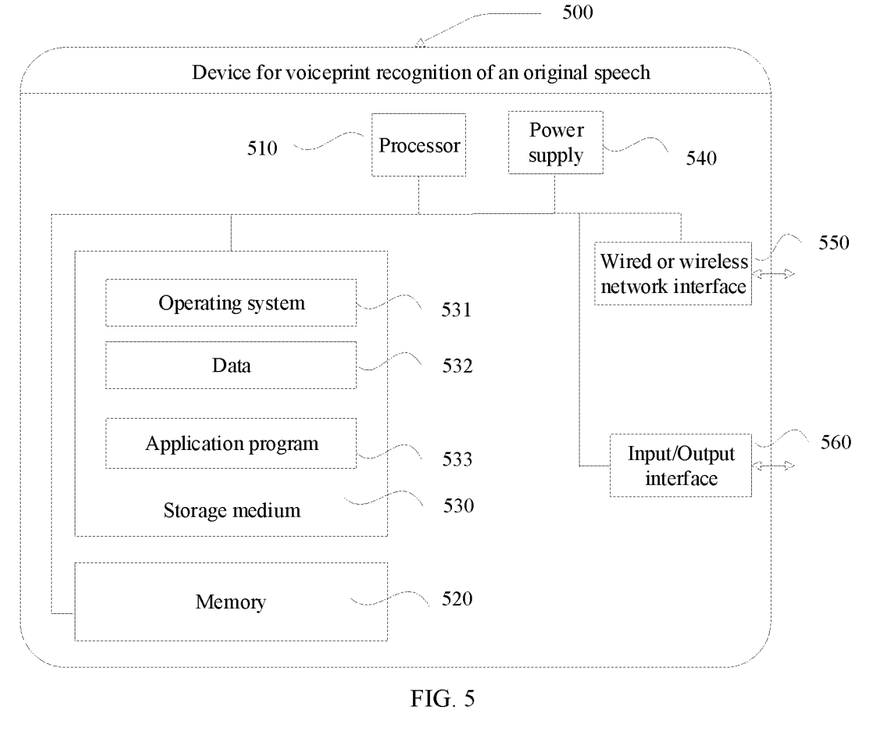
FIG. 5 is a schematic diagram of a device for voiceprint recognition of an original speech according to an embodiment of the present application.

FIG. 5 is a schematic structural diagram of a device for voiceprint recognition of an original speech according to an embodiment of the present application. The device 500 for voiceprint recognition of an original speech may have relatively large differences due to a configuration or performance difference and may include one or more processors (central processing units (CPUs)) 510, a memory 520, and one or more storage media 530 (such as one or more mass storage devices) that store an application program 533 or data 532. The memory 520 and the storage medium 530 may be used for short-time storage or persistent storage. The program stored in the storage medium 530 may include one or more modules (not shown in the figure), and each module may include a series of operation instructions in the device 500 for voiceprint recognition of an original speech. Further, the processor 510 may be configured to communicate with the storage medium 530, and execute a series of operation instructions in the storage medium 530 on the device 500 for voiceprint recognition of an original speech.

The device 500 for voiceprint recognition of an original speech may further include one or more power supplies 540, one or more wired or wireless network interfaces 550, one or more input/output interfaces 560, and/or one or more operating systems 531, such as Windows Server, Mac OS X, Unix, Linux and FreeBSD. It can be understood by a person skilled in the art that the structure of the device for voiceprint recognition of an original speech shown in FIG. 5 does not constitute a limitation to the device for voiceprint recognition of an original speech, and may include more or fewer components than those shown, or combine some components, or have different component arrangements.

The present application further provides a device for voiceprint recognition of an original speech, including: a memory and at least one processor, where the memory stores instructions, and the memory and the at least one processor are interconnected by a line; and the at least one processor invokes the instructions in the memory to enable the device for voiceprint recognition of an original speech to perform the steps of the foregoing method for voiceprint recognition of an original speech.

The present application further provides a computer-readable storage medium. The computer-readable storage medium may be a non-volatile computer-readable storage medium or a volatile computer-readable storage medium. The computer-readable storage medium stores computer instructions, and when the computer instructions are run on a computer, the computer is enabled to perform the following steps:

obtaining original speech data, and segmenting the original speech data based on a preset time length to obtain segmented speech data;

performing tail-biting convolution processing and discrete Fourier transform on the segmented speech data through a preset convolution filter bank to obtain voiceprint feature data corresponding to the segmented speech data;

pooling the voiceprint feature data corresponding to the segmented speech data through a preset deep neural network to obtain a target voiceprint feature;

performing embedded vector transformation on the target voiceprint feature to obtain corresponding voiceprint feature vectors; and performing calculation on the voiceprint feature vectors through a preset loss function to obtain target voiceprint data, where the loss function includes a cosine similarity matrix loss function and a minimum mean square error matrix loss function.

The blockchain described in the present application is a new application mode of computer technologies such as distributed data storage, point-to-point transmission, a consensus mechanism and an encryption algorithm. The blockchain is essentially a decentralized database, and is a series of data blocks associated using a cryptographic method. Each data block contains information about a batch of network transactions, which is used to verify the validity of the information (anti-counterfeiting) and generate the next block. The blockchain may include a blockchain underlying platform, a platform product service layer, an application service layer, etc. A person skilled in the art can clearly understand that for ease and brevity of description, for specific working processes of the system, apparatus and units described above, reference may be made to the corresponding processes in the foregoing method embodiments. Details are not repeated herein.

The integrated units may be stored in a computer-readable storage medium if implemented in the form of a software function unit and sold or used as a standalone product. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present application. The foregoing storage media include: a USB flash disk, a mobile hard disk, a read-only memory (ROM), a random access memory (RAM), a magnetic disk or an optical disc, and other media that can store program code.

The foregoing embodiments are only used to illustrate the technical solutions of the present application, rather than constitute a limitation thereto. Although the present application is described in detail with reference to the foregoing embodiments, it should be understood by a person of ordinary skill in the art that he/she may still modify the technical solutions described in the foregoing embodiments or equivalently replace some technical features therein; and these modifications or replacements do not make the essence of the corresponding technical solutions depart from the spirit and scope of the technical solutions of various embodiments of the present application.

What is claimed is:

1. A method for a voiceprint recognition of an original speech, comprising:

obtaining original speech data, and segmenting the original speech data based on a preset time length to obtain segmented speech data;

performing a tail-biting convolution processing and a discrete Fourier transform on the segmented speech data through a preset convolution filter bank to obtain voiceprint feature data corresponding to the segmented speech data;

pooling the voiceprint feature data corresponding to the segmented speech data through a preset deep neural network to obtain a target voiceprint feature;

performing an embedded vector transformation on the target voiceprint feature to obtain voiceprint feature vectors corresponding to the target voiceprint feature; and performing a calculation on the voiceprint feature vectors through a preset loss function to obtain target voiceprint data, wherein the preset loss function comprises a cosine similarity matrix loss function and a minimum mean square error matrix loss function.

2. The method for the voiceprint recognition of the original speech according to claim 1, wherein the step of obtaining the original speech data, and segmenting the original speech data based on the preset time length to obtain the segmented speech data comprises:

obtaining the original speech data, and performing a breakpoint detection on the original speech data based on speech signal energy and a zero-crossing rate to obtain candidate speech data;

performing a channel detection and a channel classification on the candidate speech data to obtain speech data corresponding to each classified channel; and segmenting the speech data corresponding to the each classified channel based on the preset time length to obtain the segmented speech data.

3. The method for the voiceprint recognition of the original speech according to claim 2, wherein the voiceprint feature data is stored in a blockchain, and the step of performing the tail-biting convolution processing and the discrete Fourier transform on the segmented speech data through the preset convolution filter bank to obtain the voiceprint feature data corresponding to the segmented speech data comprises:

obtaining a total number of segments of the segmented speech data, and obtaining a number of convolution filters in the preset convolution filter bank;

setting a tail-biting convolutional code based on the total number of the segments of the segmented speech data, the preset time length and the number of the convolution filters, and storing the tail-biting convolutional code in a convolutional encoder group in the preset convolution filter bank;

encoding the segmented speech data through the convolutional encoder group to obtain candidate voiceprint feature data corresponding to the segmented speech data; and performing the discrete Fourier transform on the candidate voiceprint feature data to obtain the voiceprint feature data corresponding to the segmented speech data.

4. The method for the voiceprint recognition of the original speech according to claim 3, wherein the step of pooling the voiceprint feature data corresponding to the segmented speech data through the preset deep neural network to obtain the target voiceprint feature comprises:

capturing data from the voiceprint feature data corresponding to the segmented speech data through a sliding window in the preset deep neural network to obtain a plurality of sets of window data;

separately calculating a maximum value of each of the plurality of sets of window data and an average value of each of the plurality of sets of window data, wherein the maximum value of each of the plurality of sets of window data is used as a first speaker feature, and the average value of each of the plurality of sets of window data is used as a second speaker feature; and fusing the first speaker feature and the second speaker feature to obtain the target voiceprint feature.

5. The method for the voiceprint recognition of the original speech according to claim 3, wherein after the step of performing the calculation on the voiceprint feature vectors through the preset loss function to obtain the target voiceprint data, the method further comprises:

Obtaining historical processing scheme data corresponding to the target voiceprint data from a preset database, clustering the historical processing scheme data, and obtaining a subsequent recommended processing scheme of the target voiceprint data based on a clustering result.

6. The method for the voiceprint recognition of the original speech according to claim 2, wherein after the step of performing the calculation on the voiceprint feature vectors through the preset loss function to obtain the target voiceprint data, the method further comprises:

Obtaining historical processing scheme data corresponding to the target voiceprint data from a preset database, clustering the historical processing scheme data, and obtaining a subsequent recommended processing scheme of the target voiceprint data based on a clustering result.

7. The method for the voiceprint recognition of the original speech according to claim 1, wherein the preset loss function is as follows:

$$L = L(a_{ji}) + \gamma \left( -MMSE_j + \log \sum_{k=1}^{N} \exp(MMSE_j) \right),$$

the cosine similarity matrix loss function is as follows:

$$L(a_{ji}) = -S_{ji,j} + \log \sum_{k=1}^{N} \exp(S_{ji,k}), S_{ji,k} = \begin{cases} w \cdot \cos(a_{ji}, c_j^{(-i)}) + b, & \text{if } k = j \\ w \cdot \cos(a_{ji}, c_k) + b, & \text{others} \end{cases},$$

and the minimum mean square error matrix loss function is as follows:

$$MMSE_j = \mu \frac{1}{M} \sum_{i=1}^{M} (a_{ji} - LC_{j,t})^2 + \theta, LC_{j,t} = \beta LC_{j,t-1} + (1-\beta) \frac{1}{M} \sum_{i=1}^{M} a_{ji},$$

wherein $a_{ji}$ denotes an $i^{th}$ voiceprint feature vector of a $j^{th}$ speaker, $\gamma$ denotes an adjustment factor, N denotes a number of the voiceprint feature vectors corresponding to each speaker, k denotes a $k^{th^{exp(MMSE_j)}}$ value, and $c_j^{(-i)}$ each $c_k$ denote an average value of the voiceprint feature vectors of the $j^{th}$ speaker excluding the $i^{th}$ voiceprint feature vector, w, b, $\mu$, $\theta$ and $\beta$ each denote a preset random variable, $LC_{j,t}$ denotes an average value of the voiceprint feature vectors corresponding to the $j^{th}$ speaker among the voiceprint feature vectors at a time t, and M denotes a number of speakers corresponding to the voiceprint feature vectors.

8. The method for the voiceprint recognition of the original speech according to claim 1, wherein after the step of performing the calculation on the voiceprint feature vectors through the preset loss function to obtain the target voiceprint data, the method further comprises:

obtaining historical processing scheme data corresponding to the target voiceprint data from a preset database, clustering the historical processing scheme data, and obtaining a subsequent recommended processing scheme of the target voiceprint data based on a clustering result.

9. A device for a voiceprint recognition of an original speech, comprising a memory, a processor, and a computer program stored in the memory and executable on the processor, wherein the processor implements the following steps when executing the computer program:

obtaining original speech data, and segmenting the original speech data based on a preset time length to obtain segmented speech data;

performing a tail-biting convolution processing and a discrete Fourier transform on the segmented speech data through a preset convolution filter bank to obtain voiceprint feature data corresponding to the segmented speech data;

pooling the voiceprint feature data corresponding to the segmented speech data through a preset deep neural network to obtain a target voiceprint feature;

performing an embedded vector transformation on the target voiceprint feature to obtain voiceprint feature vectors corresponding to the target voiceprint feature; and performing a calculation on the voiceprint feature vectors through a preset loss function to obtain target voiceprint data, wherein the preset loss function comprises a cosine similarity matrix loss function and a minimum mean square error matrix loss function.

10. The device for the voiceprint recognition of the original speech according to claim 9, wherein the processor further implements the following steps when executing the computer program:

obtaining the original speech data, and performing a breakpoint detection on the original speech data based on speech signal energy and a zero-crossing rate to obtain candidate speech data;

performing a channel detection and a channel classification on the candidate speech data to obtain speech data corresponding to each classified channel; and segmenting the speech data corresponding to the each classified channel based on the preset time length to obtain the segmented speech data.

11. The device for the voiceprint recognition of the original speech according to claim 10, wherein the processor further implements the following steps when executing the computer program:

obtaining a total number of segments of the segmented speech data, and obtaining a number of convolution filters in the preset convolution filter bank;

setting a tail-biting convolutional code based on the total number of the segments of the segmented speech data, the preset time length and the number of the convolution filters, and storing the tail-biting convolutional code in a convolutional encoder group in the preset convolution filter bank;

encoding the segmented speech data through the convolutional encoder group to obtain candidate voiceprint feature data corresponding to the segmented speech data; and performing the discrete Fourier transform on the candidate voiceprint feature data to obtain the voiceprint feature data corresponding to the segmented speech data.

12. The device for the voiceprint recognition of the original speech according to claim 11, wherein the processor further implements the following steps when executing the computer program:

capturing data from the voiceprint feature data corresponding to the segmented speech data through a sliding window in the preset deep neural network to obtain a plurality of sets of window data;

separately calculating a maximum value of each of the plurality of sets of window data and an average value of each of the plurality of sets of window data, wherein the maximum value of each of the plurality of sets of window data is used as a first speaker feature, and the average value of each of the plurality of sets of window data is used as a second speaker feature; and fusing the first speaker feature and the second speaker feature to obtain the target voiceprint feature.

13. The device for the voiceprint recognition of the original speech according to claim 9, wherein when the processor executes the computer program to implement the following steps, the following functions are involved:

the preset loss function is as follows:

$$L = L(a_{ji}) + \gamma \left( -MMSE_j + \log \sum_{k=1}^{N} \exp(MMSE_j) \right),$$

the cosine similarity matrix loss function is as follows:

$$L(a_{ji}) = -S_{ji,j} + \log \sum_{k=1}^{N} \exp(S_{ji,k}), S_{ji,k} = \begin{cases} w \cdot \cos(a_{ji}, c_j^{(-i)}) + b, & \text{if } k = j \\ w \cdot \cos(a_{ji}, c_k) + b, & \text{others} \end{cases},$$

and the minimum mean square error matrix loss function is as follows:

$$MMSE_j = \mu \frac{1}{M} \sum_{i=1}^{M} (a_{ji} - LC_{j,t})^2 + \theta, LC_{j,t} = \beta LC_{j,t-1} + (1-\beta) \frac{1}{M} \sum_{i=1}^{M} a_{ji},$$

wherein $a_{ji}$ denotes an $i^{th}$ voiceprint feature vector of a $j^{th}$ speaker, $\gamma$ denotes an adjustment factor, N denotes a number of the voiceprint feature vectors corresponding to each speaker, k denotes a $k^{th^{\exp(MMSE_j)}}$ value, and $c_j^{(-i)}$ each $c_k$ each denote an average value of the voiceprint feature vectors of the $j^{th}$ speaker excluding the $i^{th}$ voiceprint feature vector, w, b, $\mu$, $\theta$ and $\beta$ each denote a preset random variable, $LC_{j,t}$ denotes an average value of the voiceprint feature vectors corresponding to the $j^{th}$ speaker among the voiceprint feature vectors at a time t, and M denotes a number of speakers corresponding to the voiceprint feature vectors.

14. The device for the voiceprint recognition of the original speech according to claim 9, wherein the processor further implements the following steps when executing the computer program:

obtaining historical processing scheme data corresponding to the target voiceprint data from a preset database, clustering the historical processing scheme data, and obtaining a subsequent recommended processing scheme of the target voiceprint data based on a clustering result.

15. A non-transitory computer-readable storage medium, wherein the non-transitory computer-readable storage medium stores computer instructions, and when the computer instructions are run on a computer, the computer is enabled to perform the following steps:

obtaining original speech data, and segmenting the original speech data based on a preset time length to obtain segmented speech data;

performing a tail-biting convolution processing and a discrete Fourier transform on the segmented speech data through a preset convolution filter bank to obtain voiceprint feature data corresponding to the segmented speech data;

pooling the voiceprint feature data corresponding to the segmented speech data through a preset deep neural network to obtain a target voiceprint feature;

performing an embedded vector transformation on the target voiceprint feature to obtain voiceprint feature vectors corresponding to the target voiceprint feature; and performing a calculation on the voiceprint feature vectors through a preset loss function to obtain target voiceprint data, wherein the preset loss function comprises a cosine similarity matrix loss function and a minimum mean square error matrix loss function.

16. The non-transitory computer-readable storage medium according to claim 15, wherein when the computer instructions are run on the computer, the computer is further enabled to perform the following steps:

obtaining the original speech data, and performing a breakpoint detection on the original speech data based on speech signal energy and a zero-crossing rate to obtain candidate speech data;

performing a channel detection and a channel classification on the candidate speech data to obtain speech data corresponding to each classified channel; and segmenting the speech data corresponding to the each classified channel based on the preset time length to obtain the segmented speech data.

17. The non-transitory computer-readable storage medium according to claim 16, wherein when the computer instructions are run on the computer, the computer is further enabled to perform the following steps:
- obtaining a total number of segments of the segmented speech data, and obtaining a number of convolution filters in the preset convolution filter bank;
- setting a tail-biting convolutional code based on the total number of the segments of the segmented speech data, the preset time length and the number of the convolution filters, and storing the tail-biting convolutional code in a convolutional encoder group in the preset convolution filter bank;
- encoding the segmented speech data through the convolutional encoder group to obtain candidate voiceprint feature data corresponding to the segmented speech data; and
- performing the discrete Fourier transform on the candidate voiceprint feature data to obtain the voiceprint feature data corresponding to the segmented speech data.

18. The non-transitory computer-readable storage medium according to claim 17, wherein when the computer instructions are run on the computer, the computer is further enabled to perform the following steps:
- capturing data from the voiceprint feature data corresponding to the segmented speech data through a sliding window in the preset deep neural network to obtain a plurality of sets of window data;
- separately calculating a maximum value of each of the plurality of sets of window data and an average value of each of the plurality of sets of window data, wherein the maximum value of each of the plurality of sets of window data is used as a first speaker feature, and the average value of each of the plurality of sets of window data is used as a second speaker feature; and
- fusing the first speaker feature and the second speaker feature to obtain the target voiceprint feature.

19. The non-transitory computer-readable storage medium according to claim 15, wherein when the computer instructions are run on the computer to perform the following steps, the following functions are involved:

the preset loss function is as follows:

$$L = L(a_{ji}) + \gamma \left( -MMSE_j + \log \sum_{k=1}^{N} \exp(MMSE_j) \right),$$

the cosine similarity matrix loss function is as follows:

$$L(a_{ji}) = -S_{ji,j} + \log \sum_{k=1}^{N} \exp(S_{ji,k}), S_{ji,k} = \begin{cases} w \cdot \cos(a_{ji}, c_j^{(-i)}) + b, & \text{if } k = j \\ w \cdot \cos(a_{ji}, c_k) + b, & \text{others} \end{cases},$$

and
the minimum mean square error matrix loss function is as follows:

$$MMSE_j = \mu \frac{1}{M} \sum_{i=1}^{M} (a_{ji} - LC_{j,t})^2 + \theta, LC_{j,t} = \beta LC_{j,t-1} + (1-\beta) \frac{1}{M} \sum_{i=1}^{M} a_{ji},$$

wherein $a_{ji}$ denotes an $i^{th}$ voiceprint feature vector of a $j^{th}$ speaker, $\gamma$ denotes an adjustment factor, N denotes a number of the voiceprint feature vectors corresponding to each speaker, k denotes a $k^{th \exp(MMSE_j)}$ value, and $c_j^{(-i)}$ each $c_k$ each denote an average value of the voiceprint feature vectors of the $j^{th}$ speaker excluding the $i^{th}$ voiceprint feature vector, w, b, $\mu$, $\gamma$ and $\beta$ each denote a preset random variable, $LC_{j,t}$ denotes an average value of the voiceprint feature vectors corresponding to the $j^{th}$ speaker among the voiceprint feature vectors at a time t, and M denotes a number of speakers corresponding to the voiceprint feature vectors.

20. The non-transitory computer-readable storage medium according to claim 15, wherein when the computer instructions are run on the computer, the computer is further enabled to perform the following steps:
- obtaining historical processing scheme data corresponding to the target voiceprint data from a preset database, clustering the historical processing scheme data, and obtaining a subsequent recommended processing scheme of the target voiceprint data based on a clustering result.

* * * * *